(12) United States Patent
Ko et al.

(10) Patent No.: US 11,511,758 B2
(45) Date of Patent: Nov. 29, 2022

(54) VEHICLE CONTROL DEVICE AND VEHICLE CONTROL METHOD

(71) Applicant: JATCO LTD, Fuij (JP)

(72) Inventors: To Ko, Kanagawa (JP); Shusaku Katakura, Kanagawa (JP); Yukifumi Ootsuka, Kanagawa (JP)

(73) Assignee: Jatco Ltd, Fuji (JP)

( * ) Notice: Subject to any disclaimer, the term of this patent is extended or adjusted under 35 U.S.C. 154(b) by 403 days.

(21) Appl. No.: 16/483,800

(22) PCT Filed: Jan. 15, 2018

(86) PCT No.: PCT/JP2018/000742
§ 371 (c)(1),
(2) Date: Aug. 6, 2019

(87) PCT Pub. No.: WO2018/154995
PCT Pub. Date: Aug. 30, 2018

(65) Prior Publication Data
US 2020/0047766 A1 Feb. 13, 2020

(30) Foreign Application Priority Data
Feb. 22, 2017 (JP) .............................. JP2017-031242

(51) Int. Cl.
*B60W 40/09* (2012.01)
*B60T 7/12* (2006.01)
(Continued)

(52) U.S. Cl.
CPC .............. *B60W 40/09* (2013.01); *B60T 7/12* (2013.01); *B60T 8/1755* (2013.01); *B60W 10/06* (2013.01);
(Continued)

(58) Field of Classification Search
CPC ..................................................... B60W 40/09
See application file for complete search history.

(56) References Cited

U.S. PATENT DOCUMENTS

| 2011/0218706 A1* | 9/2011 | Mori .................... B60W 30/025 |
| | | 701/36 |
| 2017/0174221 A1* | 6/2017 | Vaughn .................. G05D 1/021 |

(Continued)

FOREIGN PATENT DOCUMENTS

| JP | 2006-111184 A | 4/2006 |
| JP | 2006-347531 A | 12/2006 |
| JP | 2011-098690 A | 5/2011 |

*Primary Examiner* — Imran K Mustafa
(74) *Attorney, Agent, or Firm* — Global IP Counselors, LLP

(57) ABSTRACT

A vehicle control device includes a travel environment recognition device configured to recognize travel environment, a vehicle travel state detection device, and an autonomous/manual driving mode controller. The autonomous/manual driving mode controller includes a learning correction unit configured to store at least one of a plurality of control parameters indicating the vehicle travel state by operation of the driver in the autonomous driving mode, and to correct the control parameter in the autonomous driving mode according to the stored control parameter. When the stored control parameter is the control parameter changed by an operation by the driver midway in passing or after passing, the learning correction unit is configured to correct the control parameter in the autonomous driving mode so that an acceleration level or the deceleration level is increased midway in passing or after passing.

9 Claims, 13 Drawing Sheets

(51) Int. Cl.
*B60T 8/1755* (2006.01)
*B60W 10/06* (2006.01)
*B60W 10/10* (2012.01)
*B60W 10/184* (2012.01)
*B60W 10/20* (2006.01)
*B60W 30/10* (2006.01)

(52) U.S. Cl.
CPC .......... *B60W 10/10* (2013.01); *B60W 10/184* (2013.01); *B60W 10/20* (2013.01); *B60W 30/10* (2013.01); *B60T 2210/20* (2013.01); *B60T 2220/02* (2013.01); *B60W 2510/06* (2013.01); *B60W 2510/10* (2013.01); *B60W 2510/18* (2013.01); *B60W 2510/20* (2013.01)

(56) References Cited

U.S. PATENT DOCUMENTS

| | | | |
|---|---|---|---|
| 2017/0197618 A1* | 7/2017 | Ali | B60W 30/16 |
| 2018/0201273 A1* | 7/2018 | Xiao | B60W 40/09 |
| 2018/0259956 A1* | 9/2018 | Kawamoto | B60W 40/09 |

* cited by examiner

VEHICLE CONTROL DEVICE AND VEHICLE CONTROL METHOD

CROSS-REFERENCE TO RELATED APPLICATIONS

This is a U.S. national phase application of PCT/JP2018/000742, filed on Jan. 15, 2018, which claims priority to Japanese Patent Application No. 2017-031242, filed on Feb. 22, 2017. The entire disclosure of Japanese Patent Application No. 2017-031242 is hereby incorporated herein by reference.

TECHNICAL FIELD

The present invention relates to a vehicle control device and a vehicle control method.

BACKGROUND ART

In Japanese Laid-Open Patent Publication No. 2006-347531, disclosed is a technique having a first travel mode of autonomous driving and a second travel mode of operation by a driver, for which control parameters learned in the second travel mode are reflected when in the first travel mode, with travel characteristics reflecting the intention of the driver in the first travel mode.

However, with the technique of Japanese Laid-Open Patent Publication No. 2006-347531, the travel state differs between the first travel mode and the second travel mode, so there is a risk that even if the learning results with the second travel mode are reflected in the first travel mode, this may not match the senses of the driver.

SUMMARY

The present invention was created taking into consideration this kind of technical problem, and the purpose is to better match the autonomous driving mode to the senses of the driver.

With the vehicle control device and the vehicle control method of the present invention, a driver's operation during autonomous driving mode is learned, and is reflected in the autonomous driving mode thereafter.

Thus, with the vehicle control device and the vehicle control method of the present invention, it is possible to better match the autonomous driving mode to the senses of the driver.

DETAILED DESCRIPTION OF EMBODIMENTS

Embodiment 1

Figure 1:
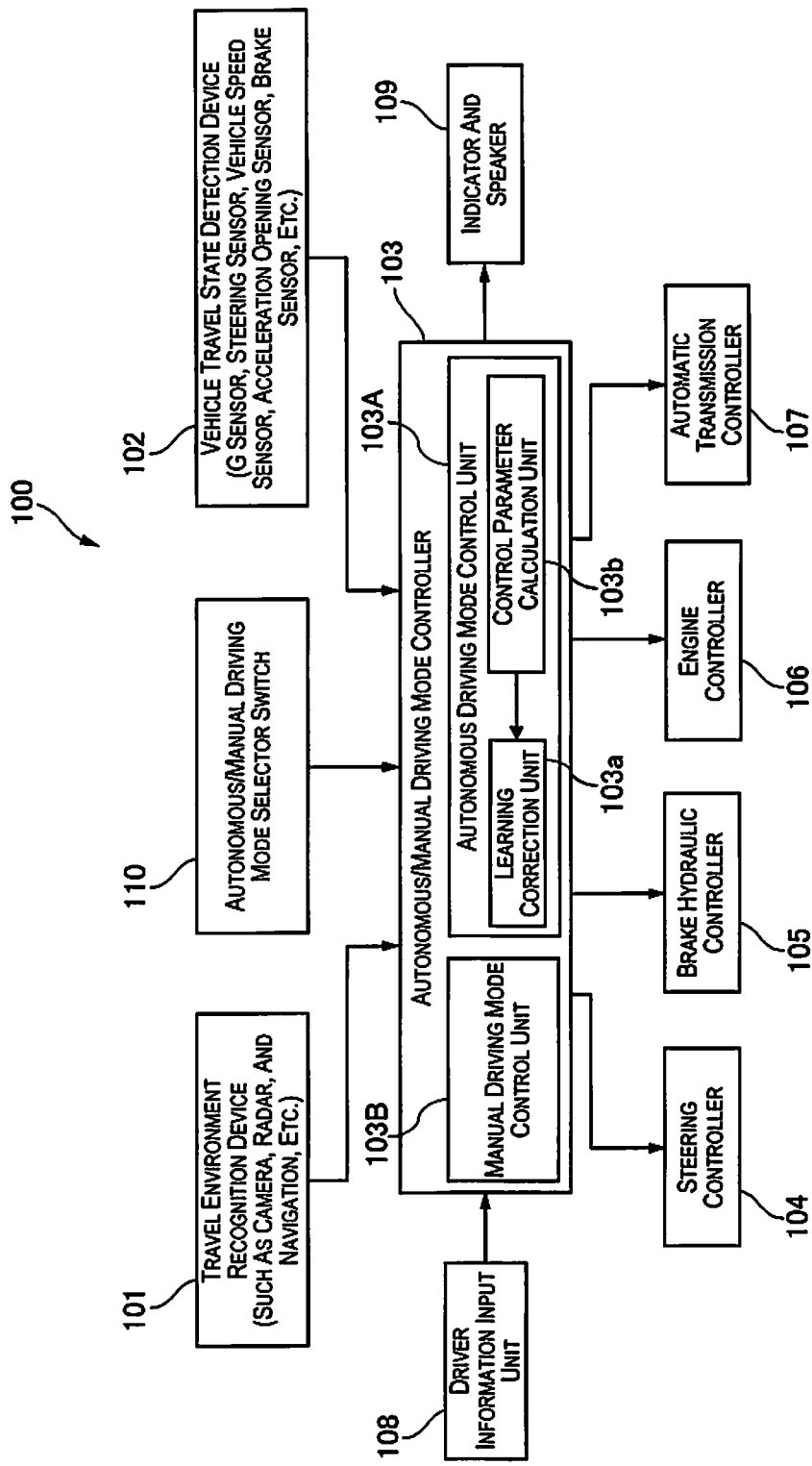
FIG. 1 is a schematic block diagram of a vehicle control device of embodiment 1.
Figure 2:
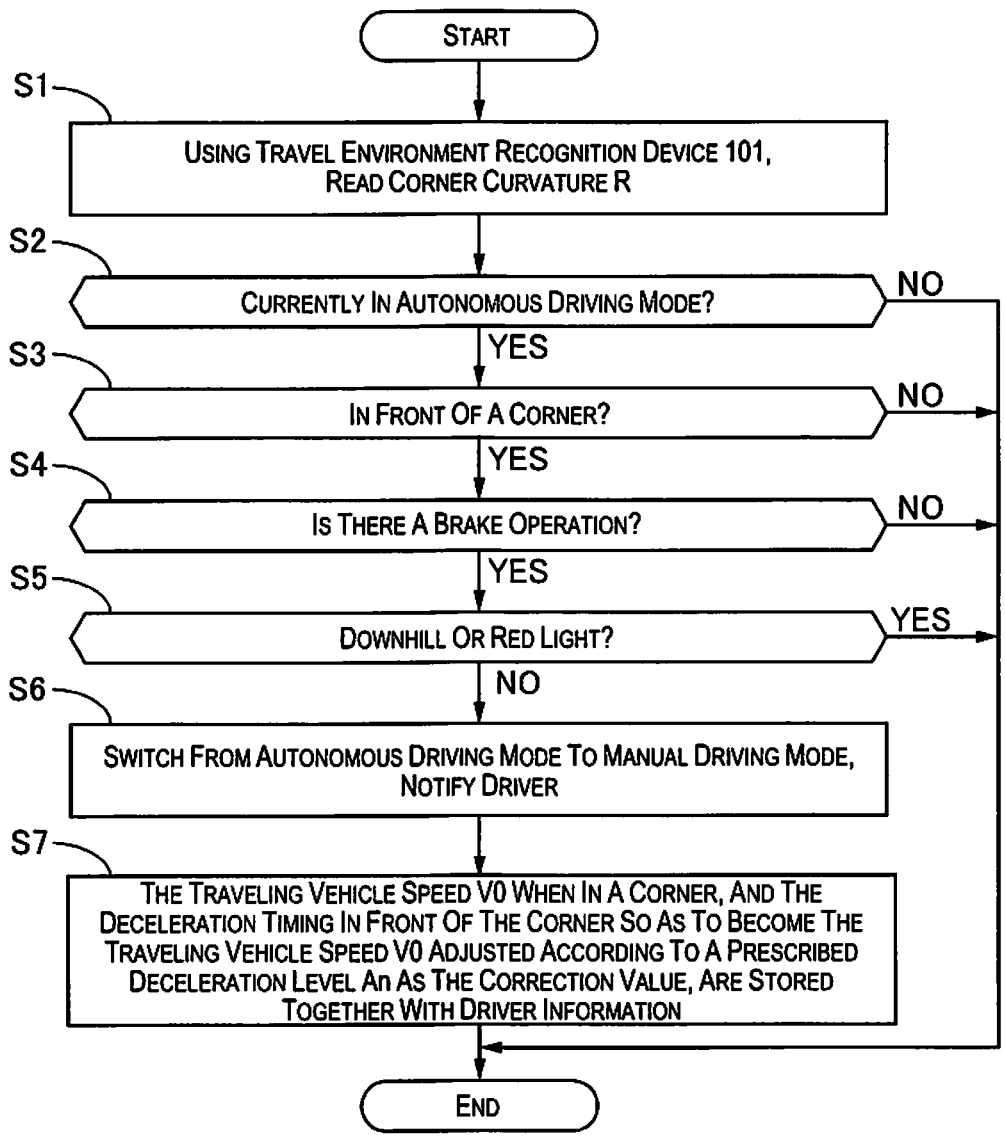
FIG. 2 is a flow chart showing the contents of processing executed by an autonomous/manual driving mode controller of embodiment 1.
Figure 3:
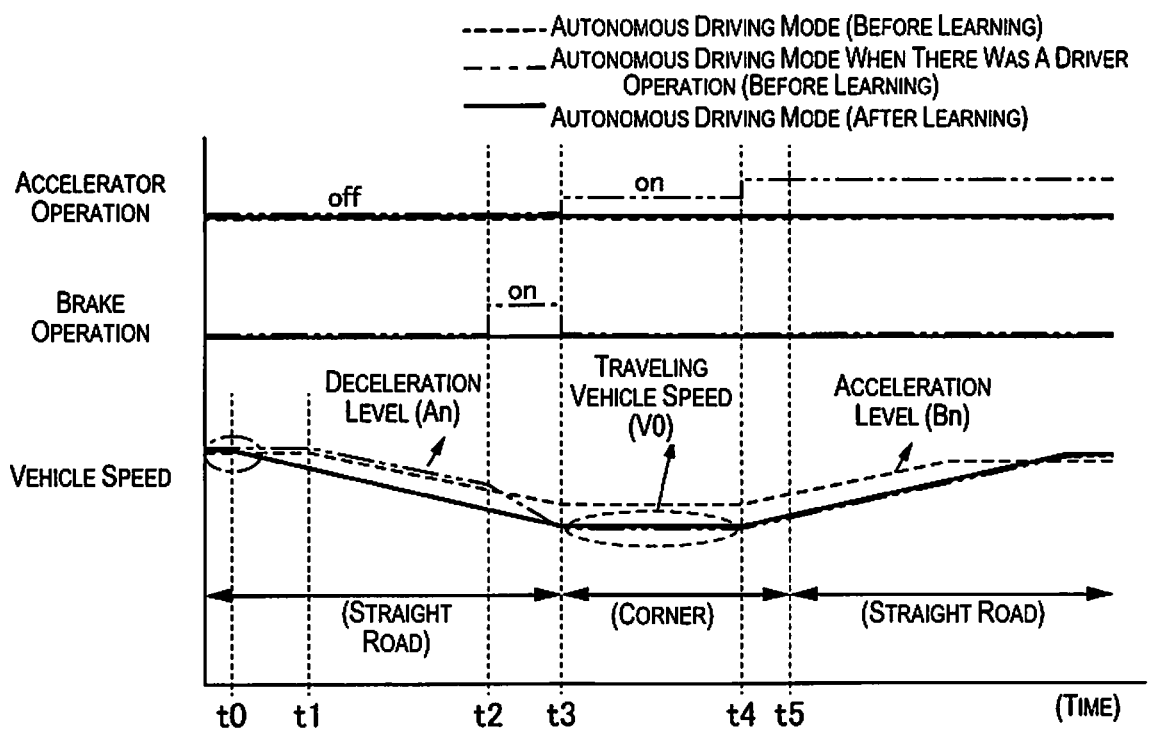
FIG. 3 is a time chart showing the state of the vehicle control of embodiment 1 being executed.

Following, embodiment 1 of the present invention is explained while referring to FIG. 1 to FIG. 3.

FIG. 1 is a schematic block diagram of a vehicle control device 100 of embodiment 1 of the present invention.

As shown in FIG. 1, the vehicle control device 100 is provided with an autonomous/manual driving mode controller 103. Inputted to this autonomous/manual driving mode controller 103 is information from: a travel environment recognition device 101 consisting of a camera, radar, a GPS sensor, navigation, etc.; a vehicle travel state detection device 102 consisting of a G sensor, a steering sensor, a vehicle speed sensor, an acceleration opening sensor, a brake sensor, etc.; an autonomous/manual driving mode switching switch 110 for which the autonomous/manual driving mode can be selected by a driver; and a driver information input unit 108 with which driver information can be input.

Also, the autonomous/manual driving mode controller 103 is provided with an autonomous driving mode control unit 103A and a manual driving mode control unit 103B. The autonomous driving mode control unit 103A has: a control parameter calculation unit 103b that calculated control parameters during autonomous driving mode using information from the travel environment recognition device 101; and a learning correction unit 103a that stores at least one of a plurality of control parameters showing the vehicle travel state by driver operation during autonomous driving mode, and that corrects control parameters calculated by the control parameter calculation unit 103b.

Furthermore, the autonomous/manual driving mode controller 103 notifies the driver whether the current driving mode is autonomous or manual using an indicator and speaker 109.

When in autonomous driving mode, based on information from the driver information input unit 108, the learning correction unit 103a of the autonomous driving mode control unit 103A corrects control parameters from the control parameter calculation unit 103b based on the stored control parameter correction values of the corresponding driver, and controls a steering controller 104, a brake hydraulic controller 105, an engine controller 106, and an automatic transmission controller 107.

Also, during the manual driving mode, the manual driving mode control unit 103B obtains driver operation information from the vehicle travel state detection device 102, and based on this operation information, controls the steering controller 104, the brake hydraulic controller 105, the engine controller 106, and the automatic transmission controller 107.

FIG. 2 is a flow chart showing the contents of process executed by the autonomous/manual driving mode controller of embodiment 1 of the present invention.

At step S1, the curvature of the corner in front of the vehicle is read using information from the travel environment recognition device 101.

At step S2, a determination is performed of whether currently in autonomous driving mode.

When determined not to be in autonomous driving mode, specifically, when in manual driving mode, the process ends.

When in the autonomous driving mode, the process moves to step S3.

At step S3, a determination is made of whether in front of a corner using information from the travel environment recognition device 101.

When determined to not be in front of a corner, the process ends.

When determined to be in front of a corner, the process moves to step S4.

At step S4, a determination is made of the presence or absence of a brake operation by the driver.

When it is determined that there is no brake operation by the driver, the process ends.

When it is determined that there is a brake operation by the driver, the process moves to step S5.

At step S5, a determination is made of whether the vehicle is traveling downhill or if the signal in front of the vehicle is a red light using information from the travel environment recognition device 101.

When determined that this is downhill or a red light, the process ends.

This is because this is an operation according to an environment that is different from the driver's senses.

When determined to not be downhill or a red light, the process moves to step S6.

At step S6, there was a brake operation by the driver, so in addition to switching to the manual driving mode, the driver is notified by the indicator and speaker 109, and the process moves to step S7.

Until the driver sets the autonomous/manual switching switch to the autonomous driving mode again, travel is performed in manual driving mode to ensure safety.

At step S7, a traveling vehicle speed V0 as the correction value of the control parameter in a corner when in the autonomous driving mode thereafter, the deceleration timing adjusted according to a prescribed deceleration level An based on this traveling vehicle speed V0, and the driver information are stored, and the process ends.

FIG. 3 is a time chart showing the state of the vehicle control of embodiment 1 being executed.

From the top, shown are the accelerator operation, the brake operation, and changes in the vehicle speed.

The dashed line shows the autonomous driving mode before learning, the double dot-dashed line shows the autonomous driving mode before learning when there is an operation by the driver, and the solid line shows changes in the vehicle speed of the autonomous driving mode after learning.

The horizontal axis shows time. Up to time t3 shows a straight road, from time t3 to t5 shows a corner, and from time t5 and thereafter shows a straight road.

At time t2 before the corner, traveling is at the vehicle speed of the autonomous driving mode before learning, but as shown by the double-dot dashed line, at time t2, the driver judges that the entering vehicle speed toward the corner is high, performs a brake operation, and compared to the vehicle speed of the autonomous driving mode before learning when in the corner, reduces the vehicle speed.

In light of that, at time t2, in addition to switching from autonomous driving mode to manual driving mode, the driver is notified by the indicator and speaker 109.

Furthermore, using the learning correction unit 103*a*, and so as to have the passing vehicle in a corner be V0, according to a prescribed deceleration level An, the deceleration start timing when in autonomous driving mode in corners of a similar curvature thereafter is corrected from time t1 to time t0, and the traveling vehicle speed V0 and the deceleration start timing t0 as correction values of the control parameters, and the driver information, are stored.

In corners of a similar curvature, as shown by the solid line, after learning, we can see that this is a vehicle speed change during autonomous driving mode that follows along the intention of the same driver.

Next, the operational effects are explained.

With the vehicle control device and the vehicle control method of embodiment 1, the operational effects listed by example below are exhibited.

(1) When entering a corner during autonomous driving mode, when a brake operation by the driver is detected, the traveling vehicle speed V0 in the corner and the deceleration start timing according to a prescribed deceleration level An so as to become this traveling vehicle speed V0 as the correction values are stored together with the driver information, and the learned correction values are made to be used in corners of similar curvature thereafter for the same driver.

Thus, it is possible to match corner travel during autonomous driving mode to the senses of the driver.

(2) By a brake operation when in autonomous driving mode, there is a switch to manual driving mode, and until the driver sets the autonomous/manual switching switch to autonomous driving mode again, travel is made to be performed in manual driving mode.

Thus, it is possible to ensure safety during traveling.

(3) Even if there was a brake operation when in autonomous driving mode, according to information from the travel environment recognition device 101, when the vehicle is traveling downhill or the signal in front of the vehicle is a red light, learning corrections are made to be prohibited.

Thus, when not an operation according to the senses of the driver, it is possible to prohibit wasteful learning corrections, so it is possible to set an autonomous driving mode that is better matched to the senses of the driver.

Figure 4:
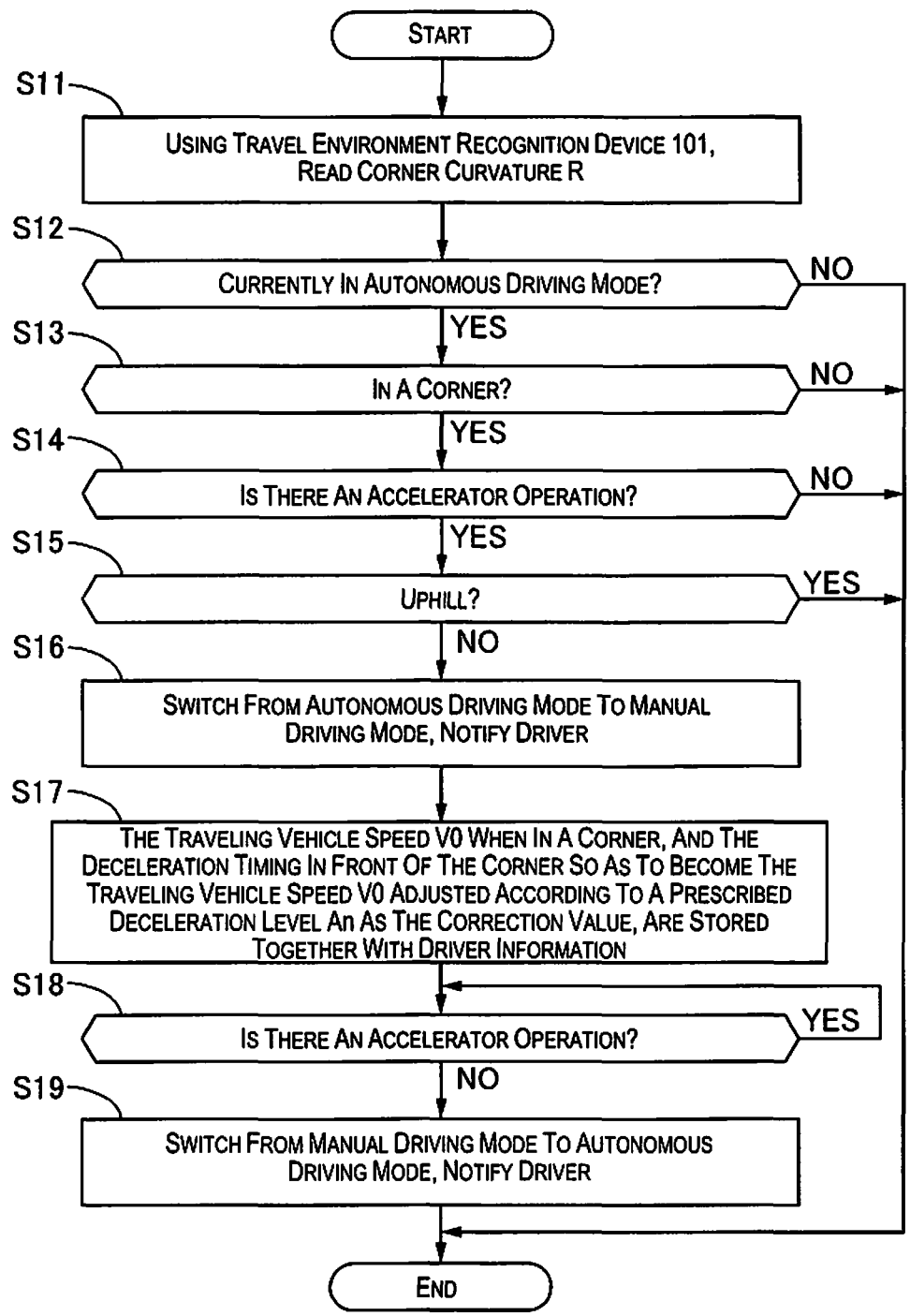
FIG. 4 is a flow chart showing the contents of the processing executed by the autonomous/manual driving mode controller of embodiment 2.

FIG. 4 is a flow chart showing the contents of the process executed by the autonomous/manual driving mode controller of embodiment 2 of the present invention.

At step S11, the curvature of the corner in front of the vehicle is read using information from the travel environment recognition device 101.

At step S12, a determination is made of whether or not in the autonomous driving mode.

When determined to not be in the autonomous driving mode, specifically, when in the manual driving mode, the process ends.

When in the autonomous driving mode, the process moves to step S13.

At step S13, a determination is performed of whether or not in a corner using information from the travel environment recognition device 101 and the vehicle travel state detection device 102.

When determined to not be in a corner, the process ends.

When determined to be in a corner, the process moves to step S14.

At step S14, a determination is performed of the presence or absence of an accelerator operation by the driver.

When determined that there is no accelerator operation by the driver, the process ends.

When determined that there is an accelerator operation by the driver, the process moves to step S15.

At step S15, a determination is performed of whether or not the vehicle is traveling uphill using information from the travel environment recognition device 101.

When determined to be uphill, the process ends.

This is because this is an operation according to an environment that is different from the driver's senses.

When determined not to be uphill, the process moves to step S16.

At step S16, there was an accelerator operation by the driver, so in addition to switching to the manual driving mode, the driver is notified by the indicator and speaker 109, and the process moves to step S17.

At step S17, the traveling vehicle speed V0 as the correction value of the control parameters when in a corner during autonomous driving mode thereafter, deceleration timing according to the prescribed deceleration level An based on this traveling vehicle speed V0, and the driver information are stored, and the process ends.

At step S18, a determination is made of whether or not the accelerator operation is continuing.

When determined that the accelerator operation is continuing, the process returns to step S18.

When determined that there is no accelerator operation, the process moves to step S19.

At step S19, in addition to switching from manual driving mode to autonomous driving mode, the driver is notified by the indicator and speaker 109, and the process ends.

In this way, when the driver has stopped the accelerator operation, by switching to the autonomous driving mode, convenience is increased.

Figure 5:
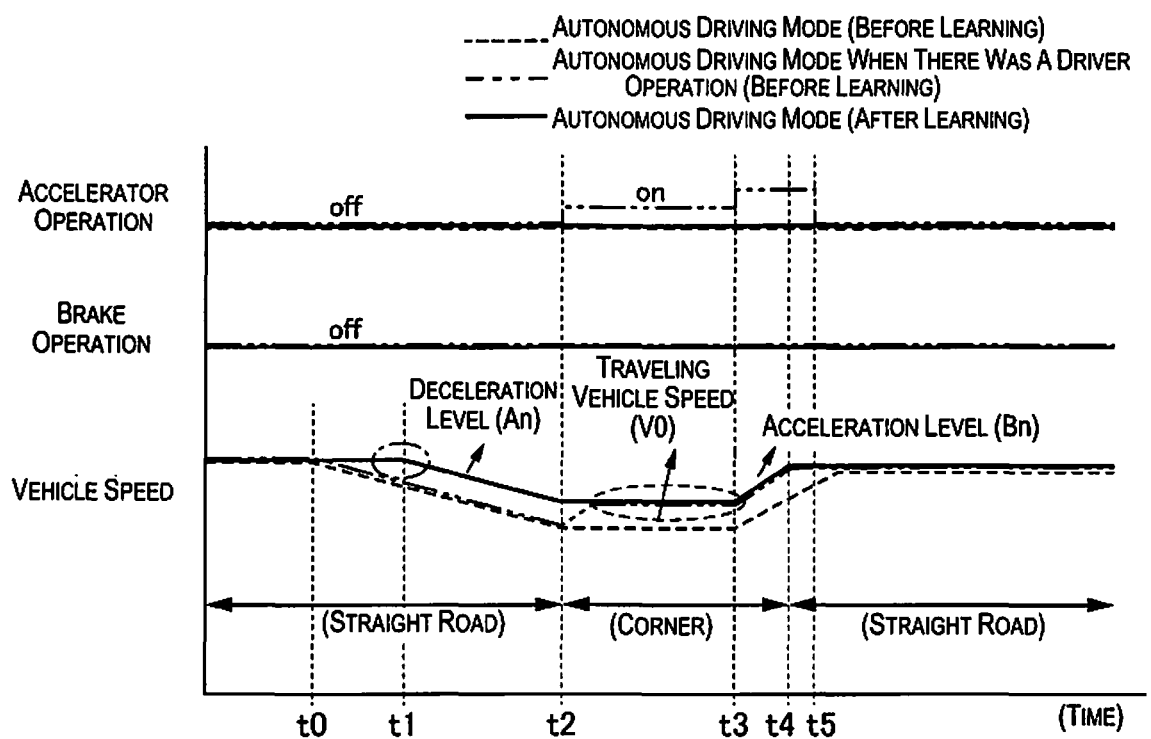
FIG. 5 is a time chart showing the state of the vehicle control of embodiment 2 being executed.

FIG. 5 is a time chart showing the state of the vehicle control of embodiment 2 being executed.

From the top, shown are the accelerator operation, the brake operation, and changes in the vehicle speed.

The dashed line shows the autonomous driving mode before learning, the double dot-dashed line shows the autonomous driving mode before learning when there is a driver operation, and the solid line shows changes in the vehicle speed of the autonomous driving mode after learning.

The horizontal axis shows time. Up to time t2 shows a straight road, from time t2 to t4 shows a corner, and from time t4 and thereafter shows a straight road.

Up to time t2 before the corner, traveling is at the vehicle speed of the autonomous driving mode before learning, but at time t2, the driver judges that the entering vehicle speed toward the corner is low, performs an accelerator operation, and compared to the vehicle speed of the autonomous driving mode before learning when in the corner, increases the vehicle speed.

In light of that, at time t2, in addition to switching from autonomous driving mode to manual driving mode, the driver is notified by the indicator and speaker 109.

Furthermore, using the learning correction unit 103a, so that the traveling vehicle speed in a corner is V0, according to a prescribed deceleration level An, the deceleration start timing when in autonomous driving mode in corners of a similar curvature thereafter is corrected from time t0 to time t1, and the traveling vehicle speed V0 and the deceleration start timing t1 as the correction values of the control parameters, and the driver information, are stored.

At time t5 when the driver stopped pressing the accelerator, in addition to switching to the autonomous driving mode, the driver is notified by the indicator and speaker 109.

In corners of a similar curvature, as shown by the solid line, after learning, we can see that this is a vehicle speed during autonomous driving mode that matches the senses of the same driver.

Next, the operational effects are explained.

With the vehicle control device and the vehicle control method of embodiment 2, the operational effects listed by example below are exhibited.

(1) When in a corner during autonomous driving mode, when an accelerator operation by the driver is detected, the traveling vehicle speed V0 in corners and the deceleration start timing according to a prescribed deceleration level An so as to become this traveling vehicle speed V0 as the correction values, are stored together with the driver information, and for the same driver, the learned correction values are made to be used in corners of similar curvature thereafter.

Thus, it is possible to match corner travel during autonomous driving mode to the senses of the driver.

(2) By an accelerator operation when in autonomous driving mode, there is a switch to manual driving mode, and when the accelerator operation by the driver is gone, travel is made to be performed in autonomous driving mode.

Thus, it is possible to ensure convenience during traveling.

(3) Even if there was an accelerator operation when in autonomous driving mode, according to information from the travel environment recognition device 101, when the vehicle is traveling uphill, learning corrections are made to be prohibited.

Thus, when not an operation according to the senses of the driver, it is possible to prohibit wasteful learning corrections, so it is possible to set an autonomous driving mode that is better matched to the senses of the driver.

Figure 6:
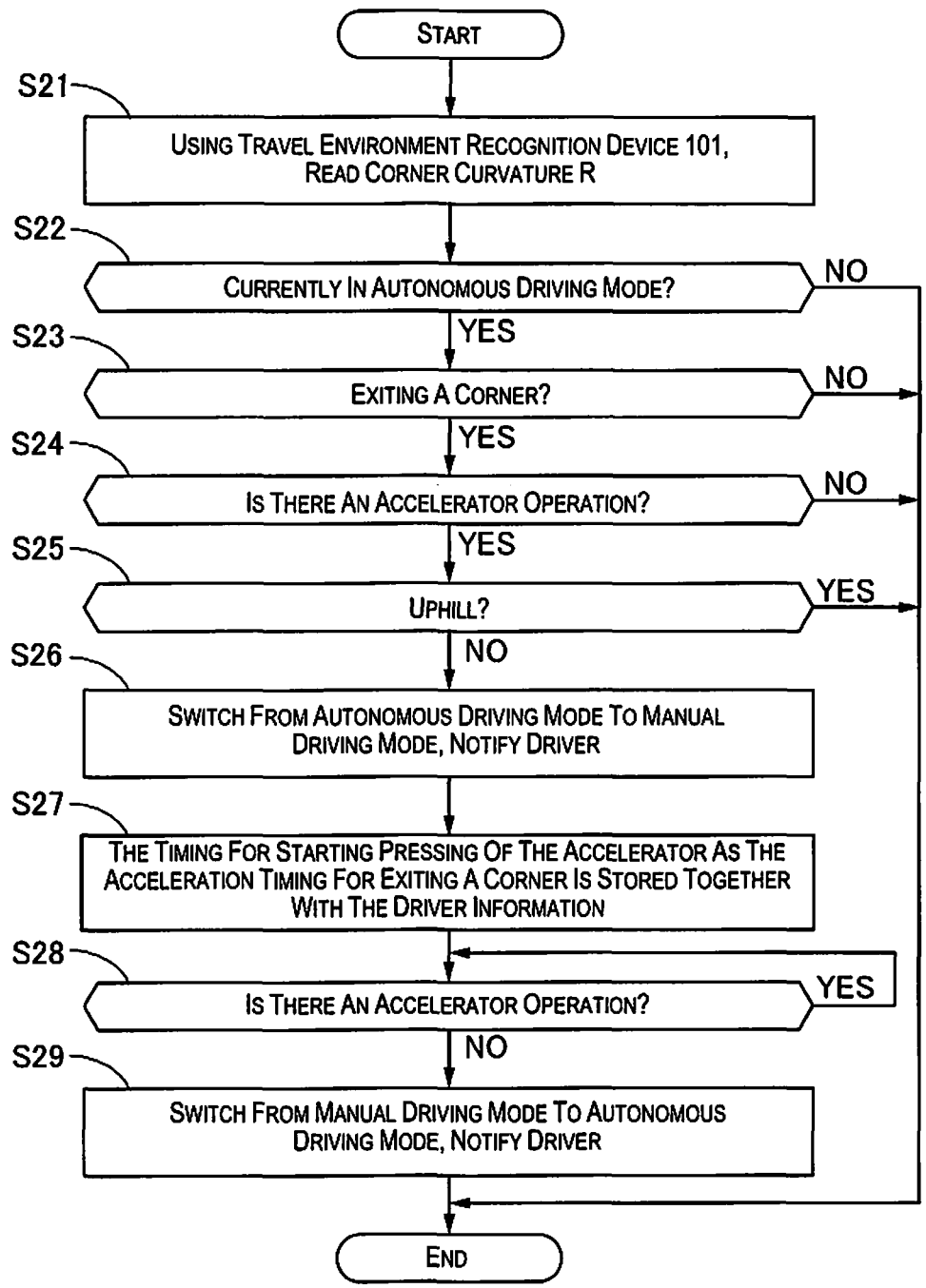
FIG. 6 is a flow chart showing the contents of processing executed by the autonomous/manual driving mode controller of embodiment 3.

FIG. 6 is a flow chart showing the contents of the process executed by the autonomous/manual driving mode controller of embodiment 3 of the present invention.

At step S21, the curvature of the corner in front of the vehicle is read using information from the travel environment recognition device 101.

At step S22, a determination is made of whether or not in the autonomous driving mode.

When determined to not be in the autonomous driving mode, specifically, when in the manual driving mode, the process ends.

When in the autonomous driving mode, the process moves to step S23.

At step S23, a determination is performed of whether exiting a corner or not using information from the travel environment recognition device 101 and the vehicle travel state detection device 102.

When determined to not be exiting a corner, the process ends.

When determined to be exiting a corner, the process moves to step S24.

At step S24, a determination is performed of the presence or absence of an accelerator operation by the driver.

When determined that there is no accelerator operation by the driver, the process ends.

When determined that there is an accelerator operation by the driver, the process moves to step S25.

At step S25, a determination is performed of whether or not the vehicle is traveling uphill using information from the travel environment recognition device 101.

When determined to be uphill, the process ends.

This is because this is an operation according to an environment that is different from the driver's senses.

When determined not to be uphill, the process moves to step S26.

At step S26, there was an accelerator operation by the driver, so in addition to switching to the manual driving mode, the driver is notified by the indicator and speaker 109, and the process moves to step S27.

At step S27, the timing at which accelerator pressing started as the correction value of the control parameters when exiting a corner when in autonomous driving mode and thereafter as the acceleration timing of exiting the corner, and the driver information, are stored, and the process ends.

At step S28, a determination is made of whether or not the accelerator operation is continuing.

When determined that the accelerator operation is continuing, the process returns to step S28.

When determined that there is no accelerator operation, the process moves to step S29.

At step S29, in addition to switching from manual driving mode to autonomous driving mode, the driver is notified by the indicator and speaker 109, and the process ends.

In this way, when the driver has stopped the accelerator operation, by switching to the autonomous driving mode, convenience is increased.

Figure 7:
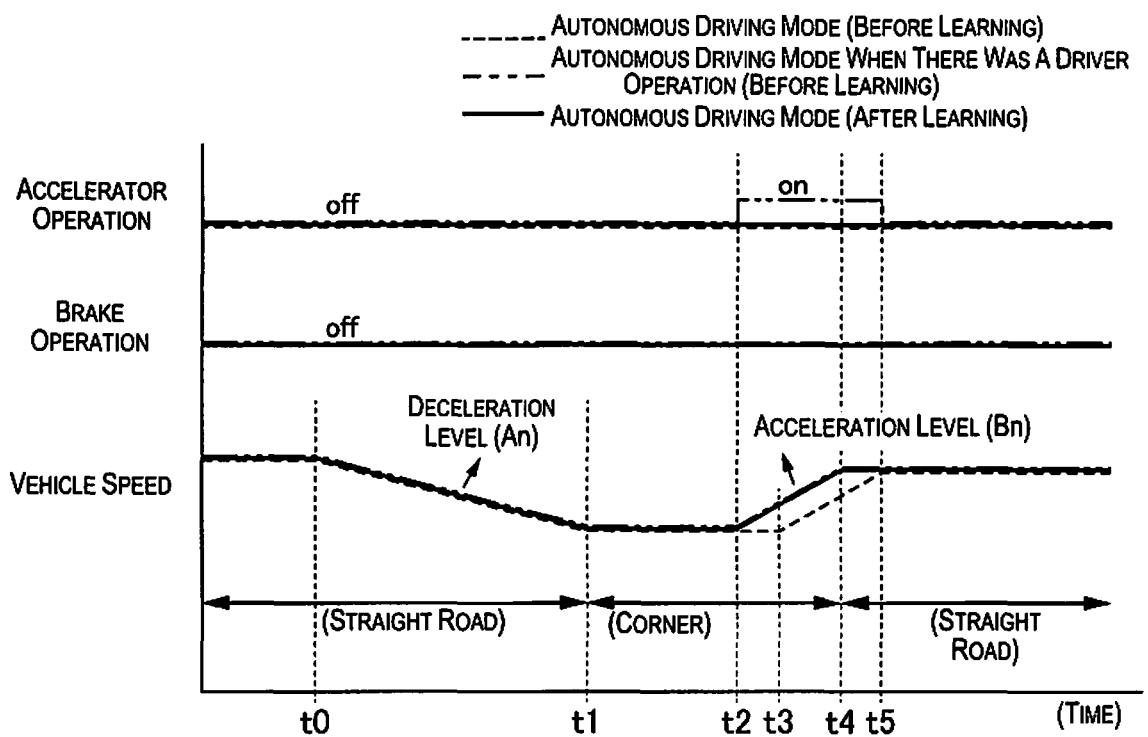
FIG. 7 is a time chart showing the state of the vehicle control of embodiment 3 being executed.

FIG. 7 is a time chart showing the state of the vehicle control of embodiment 3 being executed.

From the top, shown are the accelerator operation, the brake operation, and changes in the vehicle speed.

The dashed line shows the autonomous driving mode before learning, the double dot-dashed line shows the autonomous driving mode before learning when there is an operation by the driver, and the solid line shows changes in the vehicle speed of the autonomous driving mode after learning.

The horizontal axis shows time. Up to time t1 shows a straight road, from time t1 to t3 shows a corner, and from time t3 and thereafter shows a straight road.

At time t2 of exiting a corner, traveling is at the vehicle speed of the autonomous driving mode before learning, but at time t2, the driver judges that the vehicle speed for exiting a corner is low, performs an accelerator operation, and compared to the acceleration timing of the autonomous driving mode before learning when in a corner, makes the acceleration time earlier.

In light of that, at time t2, in addition to switching from autonomous driving mode to manual driving mode, the driver is notified by the indicator and speaker 109.

Furthermore, using the learning correction unit 103a, the acceleration start timing during autonomous driving mode when exiting a corner of a similar curvature thereafter is corrected to time t2 for which accelerator pressing has started, and the acceleration start timing time t2 as the control parameter and the driver information are stored.

At time t5 when the driver stopped pressing the accelerator, in addition to switching to the autonomous driving mode, the driver is notified by the indicator and speaker 109.

In corners of a similar curvature, as shown by the solid line, after learning, we can see that this is an acceleration timing during exiting of a corner during autonomous driving mode that matches the senses of the same driver.

Next, the operational effects are explained.

With the vehicle control device and the vehicle control method of embodiment 3, the operational effects listed by example below are exhibited.

(1) When exiting a corner during autonomous driving mode, when an accelerator operation by the driver is detected, the accelerator press start timing as the correction value of the control parameters when exiting a corner as the acceleration timing of exiting a corner is stored together with the driver information, and the learned correction values are made to be used in corners of similar curvature thereafter for the same driver.

Thus, it is possible to match travel during autonomous driving mode to the senses of the driver.

(2) By an accelerator operation when in autonomous driving mode, there is a switch to manual driving mode, and when the accelerator operation by the driver is gone, travel is made to be performed in autonomous driving mode.

Thus, it is possible to ensure convenience during traveling.

(3) Even if there was an accelerator operation when in autonomous driving mode, according to information from the travel environment recognition device 101, when the vehicle is traveling uphill, learning corrections are made to be prohibited.

Thus, when not an operation according to the senses of the driver, it is possible to prohibit wasteful learning corrections, so it is possible to set an autonomous driving mode that is better matched to the senses of the driver.

Figure 8:
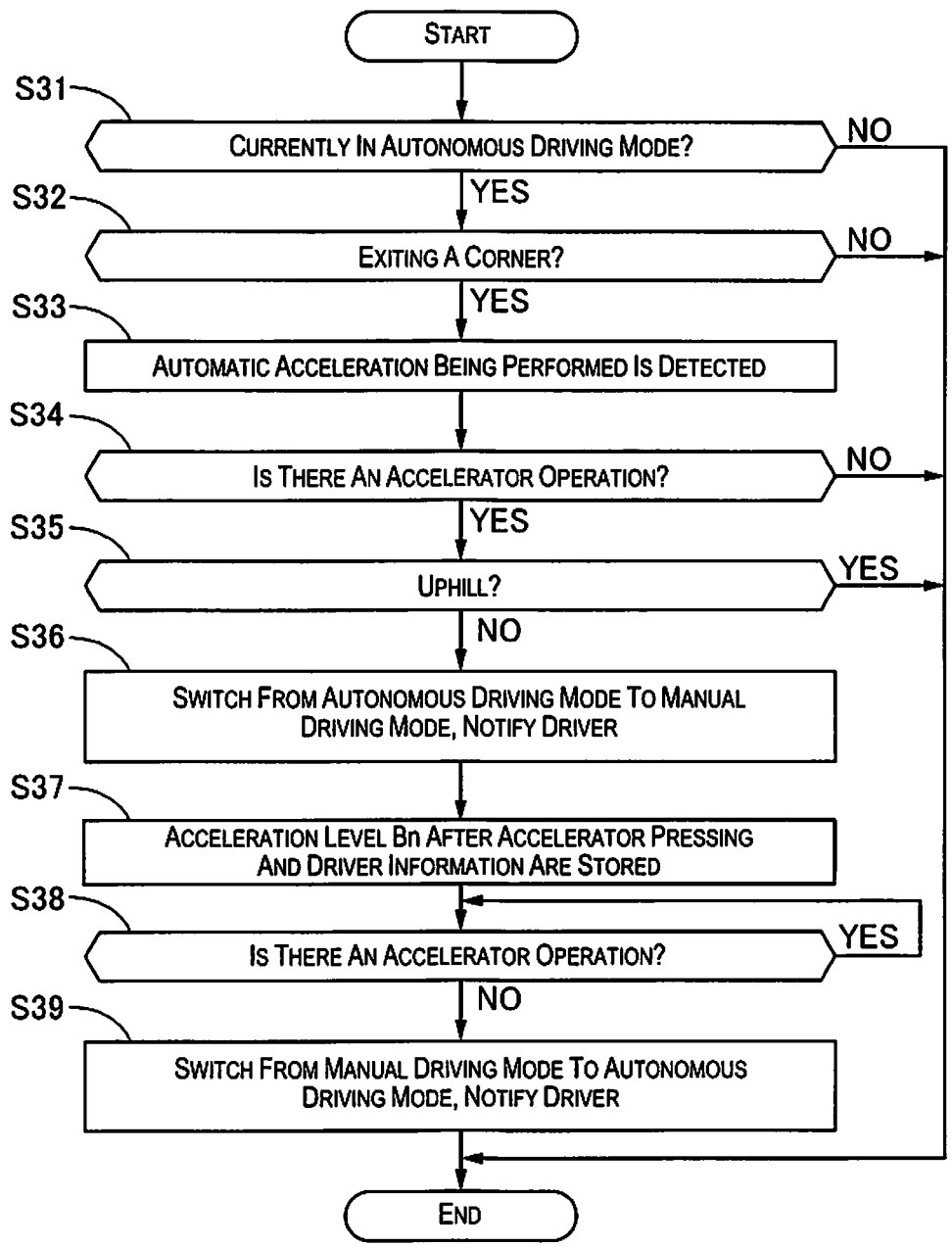
FIG. 8 is a flow chart showing the contents of processing executed by the autonomous/manual driving mode controller of embodiment 4.

FIG. 8 is a flow chart showing the contents of the process executed by the autonomous/manual driving mode controller of embodiment 4 of the present invention.

At step S31, a determination is made of whether or not in the autonomous driving mode.

When determined to not be in the autonomous driving mode, specifically, when in the manual driving mode, the process ends.

When in the autonomous driving mode, the process moves to step S32.

At step S32, a determination is performed of whether exiting a corner or not using information from the travel environment recognition device 101 and the vehicle travel state detection device 102.

When determined to not be exiting a corner, the process ends.

When determined to be exiting a corner, the process moves to step S33.

At step S33, being in automatic acceleration is detected, and the process moves to step S34.

At step S34, a determination is performed of the presence or absence of an accelerator operation by the driver.

When determined that there is no accelerator operation by the driver, the process ends.

When determined that there is an accelerator operation by the driver, the process moves to step S35.

At step S35, a determination is performed of whether or not the vehicle is traveling uphill using information from the travel environment recognition device 101.

When determined to be uphill, the process ends.

This is because this is an operation according to an environment that is different from the driver's senses.

When determined not to be uphill, the process moves to step S36.

At step S36, there was an accelerator operation by the driver, so in addition to switching to the manual driving mode, the driver is notified by the indicator and speaker 109, and the process moves to step S37.

At step S37, an acceleration level Bn after pressing the accelerator as the correction value of the control parameters when exiting a corner in autonomous driving mode thereafter, and the driver information, are stored, and the process moves to step S38.

At step S38, a determination is made of whether or not the accelerator operation is continuing.

When determined that the accelerator operation is continuing, the process returns to step S38.

When determined that there is no accelerator operation, the process moves to step S39.

At step S39, in addition to switching from manual driving mode to autonomous driving mode, the driver is notified by the indicator and speaker 109.

In this way, when the driver has stopped the accelerator operation, by switching to the autonomous driving mode, convenience is increased.

Figure 9:
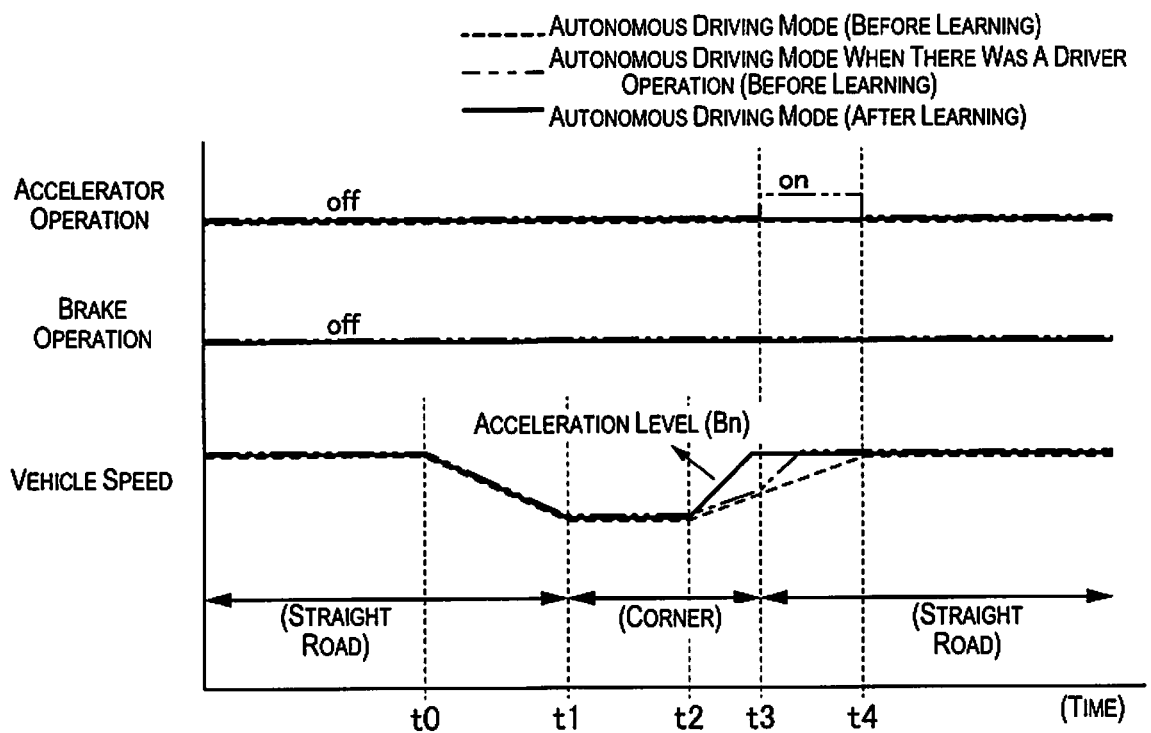
FIG. 9 is a time chart showing the state of the vehicle control of embodiment 4 being executed.

FIG. 9 is a time chart showing the state of the vehicle control of embodiment 4 being executed.

From the top, shown are the accelerator operation, the brake operation, and changes in the vehicle speed.

The dashed line shows the autonomous driving mode before learning, the double dot-dashed line shows the autonomous driving mode before learning when there is driver operation, and the solid line shows changes in the vehicle speed of the autonomous driving mode after learning.

The horizontal axis shows time. Up to time t1 shows a straight road, from time t1 to t3 shows a corner, and from time t3 and thereafter shows a straight road.

Until time t3 of exiting a corner, traveling is at the vehicle speed of the autonomous driving mode before learning, but at time t3, the driver judges that the vehicle speed after exiting a corner is low, performs an accelerator operation, and compared to the acceleration level of the autonomous driving mode before learning from exiting a corner and thereafter, the acceleration level is increased.

In light of that, at time t3, in addition to switching from autonomous driving mode to manual driving mode, the driver is notified by the indicator and speaker 109.

Furthermore, using the learning correction unit 103*a*, the acceleration level during autonomous driving mode when exiting a corner of a similar curvature thereafter is corrected to acceleration level Bn after accelerator pressing, and the acceleration level Bn as the control parameter and the driver information are stored.

At time t4 when the driver stopped pressing the accelerator, in addition to switching to the autonomous driving mode, the driver is notified by the indicator and speaker 109.

In corners of a similar curvature, as shown by the solid line, after learning, we can see that this is an acceleration level when exiting a corner during autonomous driving mode that matches the senses of the same driver.

Next, the operational effects are explained.

With the vehicle control device and the vehicle control method of embodiment 4, the operational effects listed by example below are exhibited.

(1) When exiting a corner during autonomous driving mode, when an accelerator operation by the driver is detected, the acceleration level Bn after accelerator pressing as the correction value of the control parameters when exiting a corner is stored together with the driver information, and for the same driver, the learned correction values are made to be used in corners of similar curvature thereafter.

Thus, it is possible to match traveling when exiting a corner during autonomous driving mode to the senses of the driver.

(2) By an accelerator operation when in autonomous driving mode, there is a switch to manual driving mode, and when the accelerator operation by the driver is gone, travel is made to be performed in autonomous driving mode.

Thus, it is possible to ensure convenience during traveling after exiting a corner.

(3) Even if there was an accelerator operation when in autonomous driving mode, according to information from the travel environment recognition device 101, when the vehicle is traveling uphill, learning corrections are made to be prohibited.

Thus, when not an operation according to the senses of the driver, it is possible to prohibit wasteful learning corrections, so it is possible to set an autonomous driving mode that is better matched to the senses of the driver.

Figure 10:
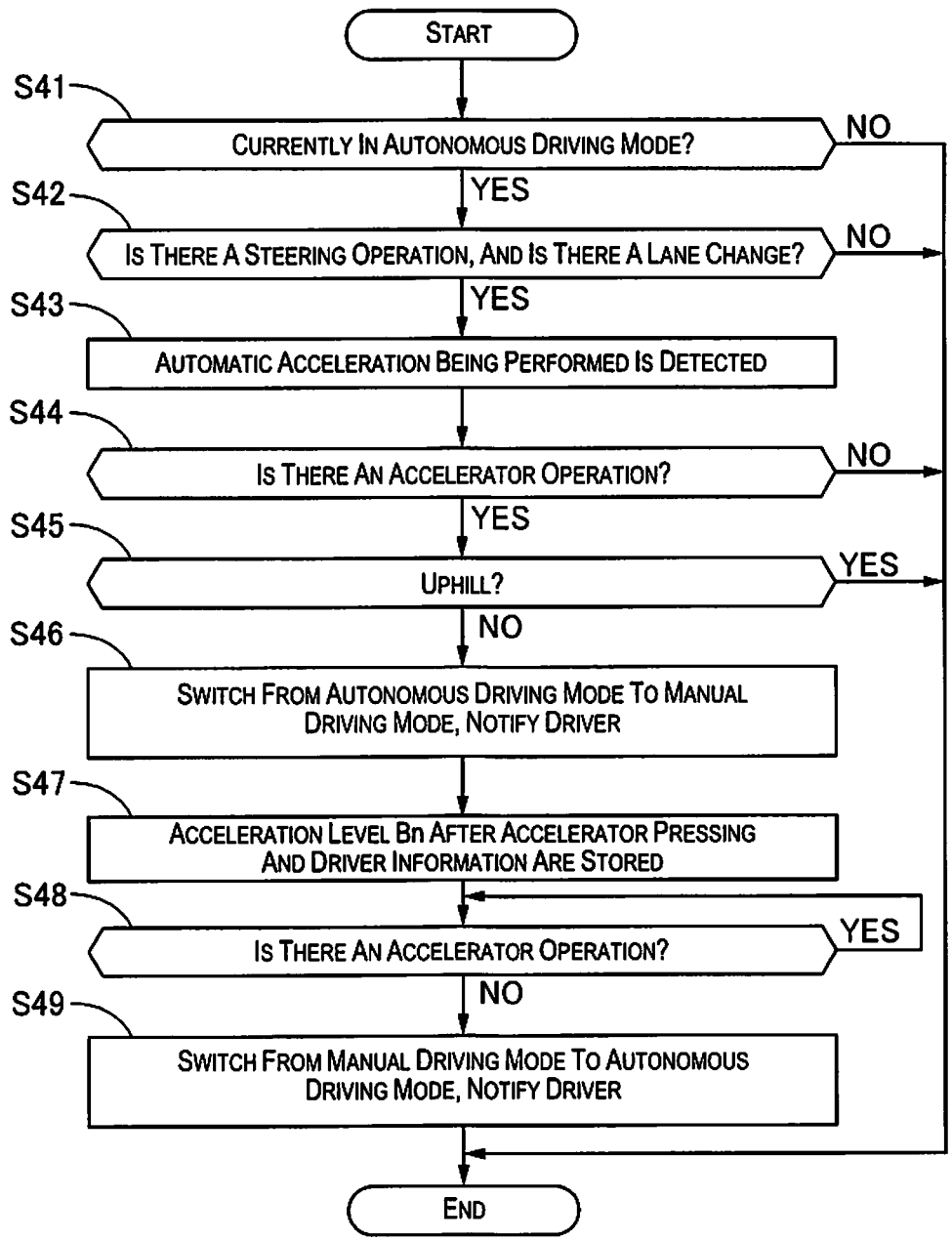
FIG. 10 is a flow chart showing the contents of processing executed by the autonomous/manual driving mode controller of embodiment 5.

FIG. 10 is a flow chart showing the contents of the process executed by the autonomous/manual driving mode controller of embodiment 5 of the present invention.

At step S41, a determination is made of whether or not in the autonomous driving mode.

When determined to not be in the autonomous driving mode, specifically, when in the manual driving mode, the process ends.

When in the autonomous driving mode, the process moves to step S42.

At step S42, a determination is performed of whether there is a steering operation and a lane change using information from the travel environment recognition device 101 and the vehicle travel state detection device 102.

When determined that there is not a steering operation and a lane change, the process ends.

When determined that there is a steering operation and a lane change, the process moves to step S43.

At step S43, being in automatic acceleration is detected, and the process moves to step S44.

At step S44, a determination is performed of the presence or absence of an accelerator operation by the driver.

When determined that there is no accelerator operation by the driver, the process ends.

When determined that there is an accelerator operation by the driver, the process moves to step S45.

At step S45, a determination is performed of whether or not the vehicle is traveling uphill using information from the travel environment recognition device 101.

When determined to be uphill, the process ends.

This is because this is an operation according to an environment that is different from the driver's senses.

When determined not to be uphill, the process moves to step S46.

At step S46, there was an accelerator operation by the driver, so in addition to switching to the manual driving mode, the driver is notified by the indicator and speaker 109, and the process moves to step S47.

At step S47, the acceleration level Bn after pressing the accelerator as the correction value of the control parameters when passing during autonomous driving mode thereafter, and the driver information, are stored, and the process moves to step S48.

At step S48, a determination is made of whether or not the accelerator operation is continuing.

When determined that the accelerator operation is continuing, the process returns to step S48.

When determined that there is no accelerator operation, the process moves to step S49.

At step S49, in addition to switching from manual driving mode to autonomous driving mode, the driver is notified by the indicator and speaker 109.

In this way, when the driver has stopped the accelerator operation, by switching to the autonomous driving mode, convenience is increased.

Figure 11:
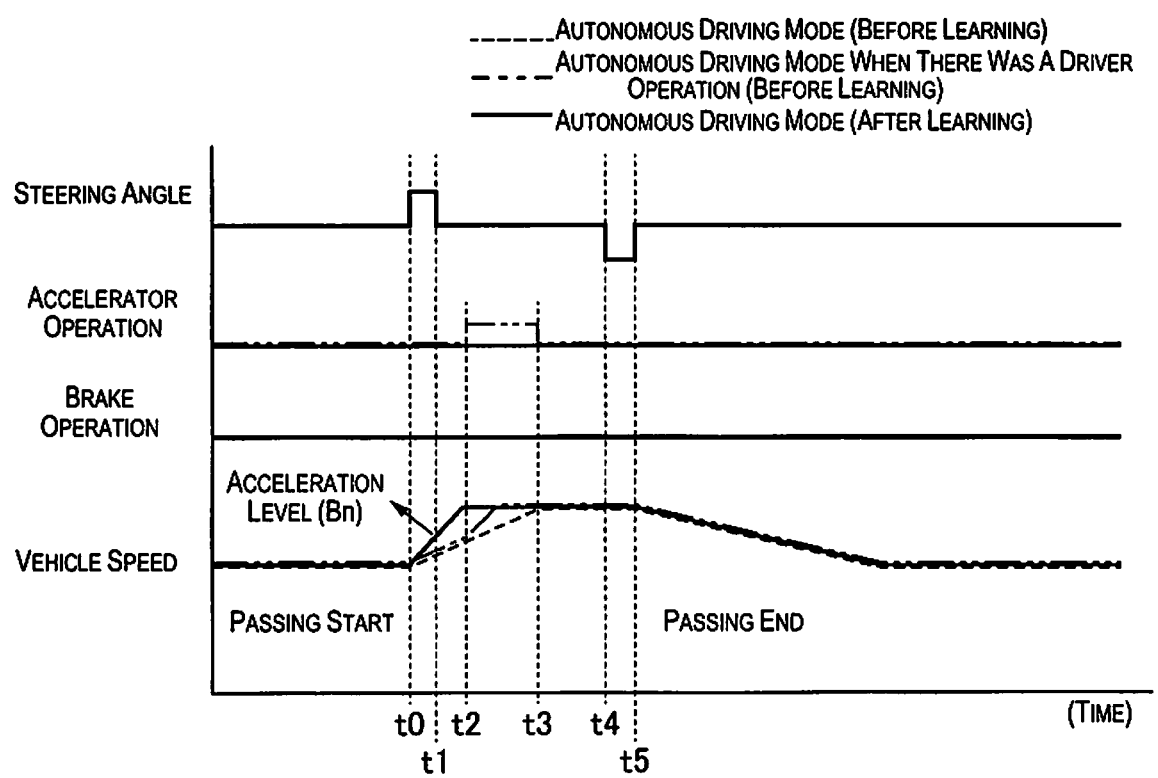
FIG. 11 is a time chart showing the state of the vehicle control of embodiment 5 being executed.

FIG. 11 is a time chart showing the state of the vehicle control of embodiment 5 being executed.

From the top, shown are the steering angle, the accelerator operation, the brake operation, and changes in the vehicle speed.

The dashed line shows the autonomous driving mode before learning, the double dot-dashed line shows the autonomous driving mode before learning when there is driver operation, and the solid line shows changes in the vehicle speed of the autonomous driving mode after learning.

The horizontal axis shows time. At time t0, the driver performs a steering operation, and at time t1, moves to a passing lane, and is accelerating while performing straight travel. At time t4, passing ends, the driver performs a steering operation, at time t5 returns to the travel lane, and performs straight travel.

Here, until time t2 when accelerating in the passing lane, traveling is done at the acceleration level of the autonomous driving mode before learning, but at time t2, the driver judges that the acceleration level for passing is low, performs an acceleration operation, and compared to the acceleration level of the autonomous driving mode before learning, the acceleration level Bn is increased.

In light of that, at time t2, in addition to switching from autonomous driving mode to manual driving mode, the driver is notified by the indicator and speaker 109.

Furthermore, using the learning correction unit 103a, the acceleration level when in autonomous driving mode during similar passing thereafter is corrected to acceleration level Bn after accelerator pressing, and the acceleration level Bn as the control parameter and the driver information are stored.

At time t3 when the driver stopped pressing the accelerator, in addition to switching to the autonomous driving mode, the driver is notified by the indicator and speaker 109.

During similar passing, as shown by the solid line, after learning, we can see that this is an acceleration level of the passing lane during autonomous driving mode that matches the senses of the same driver.

Next, the operational effects are explained.

With the vehicle control device and the vehicle control method of embodiment 5, the operational effects listed by example below are exhibited.

(1) When passing during autonomous driving mode, when an accelerator operation by the driver is detected, the acceleration level Bn after accelerator pressing as the correction value of the control parameters is stored together with the driver information, and the learned correction values are made to be used when passing thereafter for the same driver.

Thus, it is possible to match traveling when passing during autonomous driving mode to the senses of the driver.

(2) By an accelerator operation when in autonomous driving mode, there is a switch to manual driving mode, and when the accelerator operation by the driver is gone, travel is made to be performed in autonomous driving mode.

Thus, it is possible to ensure convenience during traveling when passing.

(3) Even if there was an accelerator operation when in autonomous driving mode, according to information from the travel environment recognition device 101, when the vehicle is traveling uphill, learning corrections are made to be prohibited.

Thus, when not an operation according to the senses of the driver, it is possible to prohibit wasteful learning corrections, so it is possible to set an autonomous driving mode that is better matched to the senses of the driver.

Figure 12:
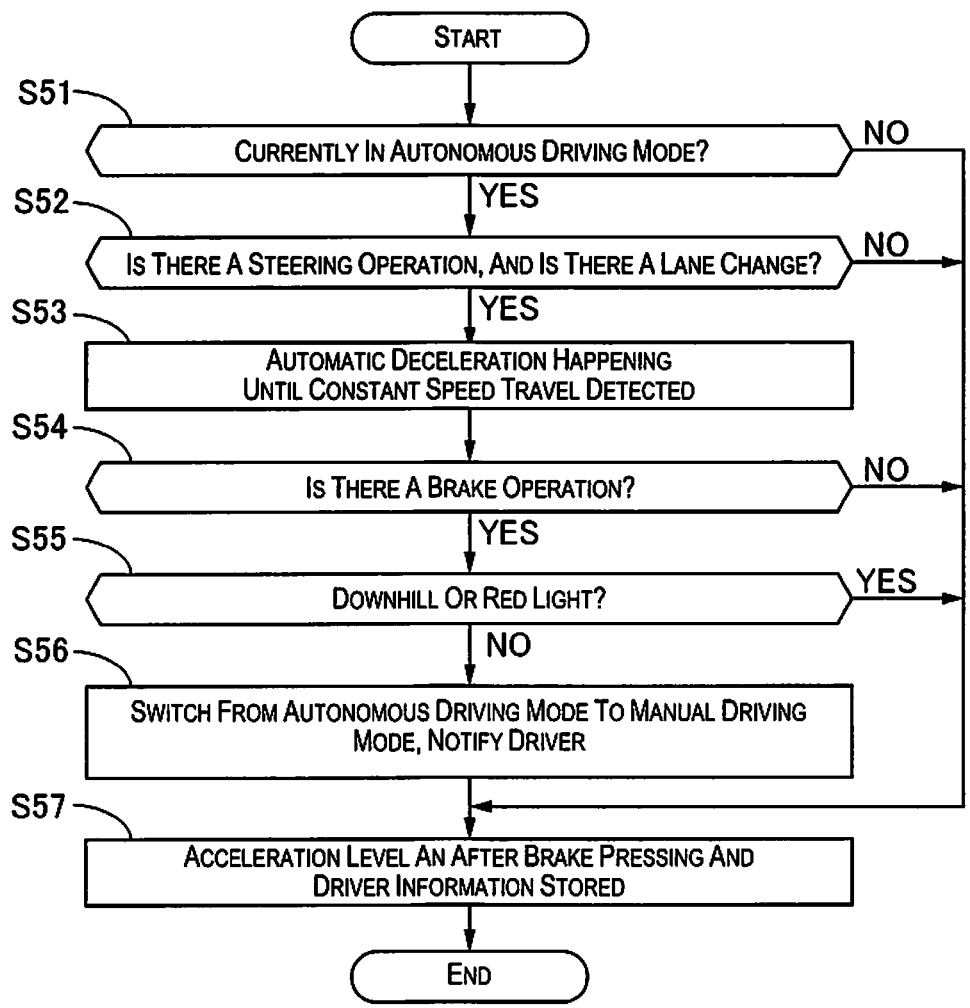
FIG. 12 is a flow chart showing the contents of processing executed by the autonomous/manual driving mode controller of embodiment 6.

FIG. 12 is a flow chart showing the contents of the process executed by the autonomous/manual driving mode controller of embodiment 6 of the present invention.

At step S51, a determination is made of whether or not in the autonomous driving mode.

When determined to not be in the autonomous driving mode, specifically, when in the manual driving mode, the process ends.

When in the autonomous driving mode, the process moves to step S52.

At step S52, a determination is performed of whether there is a steering operation and a lane change using information from the travel environment recognition device 101 and the vehicle travel state detection device 102.

When determined that there is not a steering operation and a lane change, the process ends.

When determined that there is a steering operation and a lane change, the process moves to step S53.

At step S53, being in automatic deceleration until constant speed travel is detected, and the process moves to step S54.

At step S54, a determination is performed of the presence or absence of a brake operation by the driver.

When determined that there is no brake operation by the driver, the process ends.

When determined that there is a brake operation by the driver, the process moves to step S55.

At step S55, a determination is performed of whether or not the vehicle is traveling downhill or the signal in front of the vehicle is a red light using information from the travel environment recognition device 101.

When determined to be downhill, or that the signal in front of the vehicle is a red light, the process ends.

This is because this is an operation according to an environment that is different from the driver's senses.

When determined not to be downhill or that the signal in front of the vehicle is not a red light, the process moves to step S56.

At step S56, there was an accelerator operation by the driver, so in addition to switching to the manual driving mode, the driver is notified by the indicator and speaker 109, and the process moves to step S57.

Until the driver does an autonomous/manual switching switch to autonomous driving mode again, to ensure safety, traveling is performed in manual driving mode.

At step S57, a deceleration level An after pressing the brake as the correction value of the control parameters when passing in autonomous driving mode thereafter, and the driver information, are stored, and the process ends.

Figure 13:
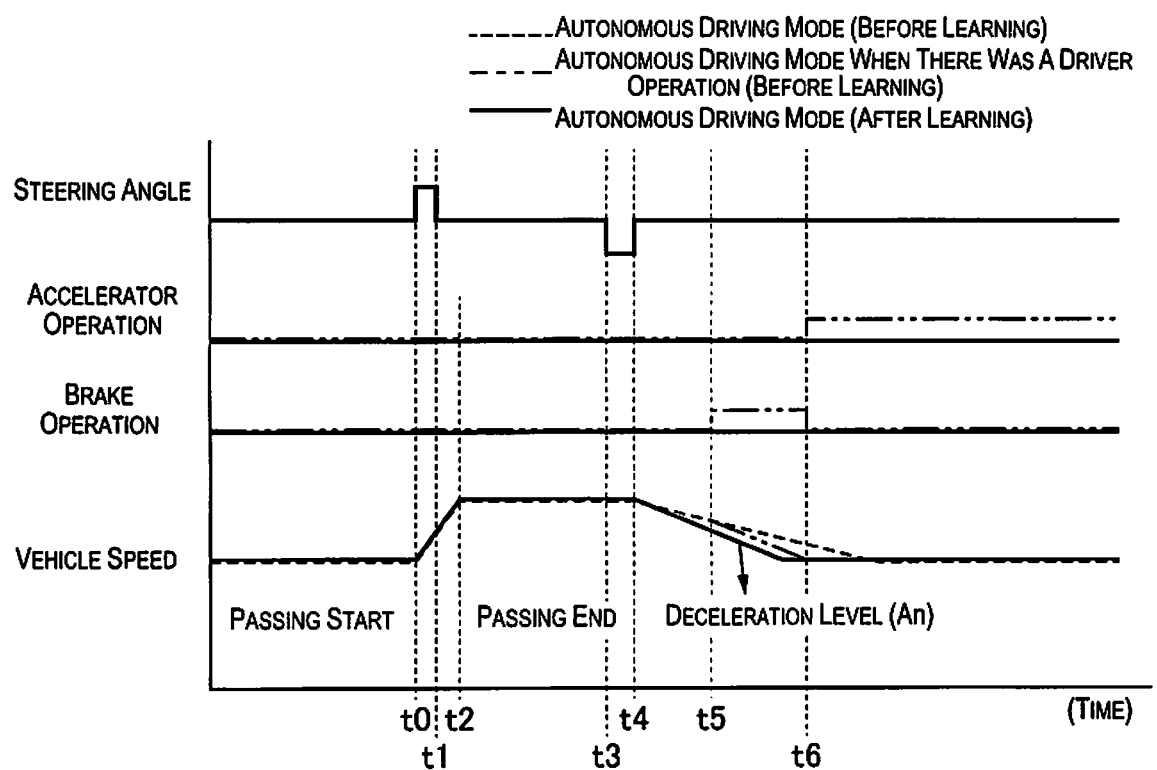
FIG. 13 is a time chart showing the state of the vehicle control of embodiment 6 being executed.

FIG. 13 is a time chart showing the state of the vehicle control of embodiment 6 being executed.

From the top, shown are the steering angle, the accelerator operation, the brake operation, and changes in the vehicle speed.

The dashed line shows the autonomous driving mode before learning, the double dot-dashed line shows the autonomous driving mode before learning when there is a driver operation, and the solid line shows changes in the vehicle speed of the autonomous driving mode after learning.

The horizontal axis shows time. At time t0, the driver performs a steering operation, and at time t1, moves to a passing lane, and is accelerating while performing straight travel. At time t3, passing ends, the driver performs a steering operation, and at time t4 returns to the travel lane, and performs straight travel.

Here, until time t5 during deceleration in the travel lane after passing ends, traveling is done at the vehicle speed of the autonomous driving mode before learning, but at time t5, the driver judges that the vehicle speed after passing is high, and performs the brake operation, and compared to the deceleration level of the autonomous driving mode before learning, the deceleration level An is increased.

In light of that, at time t5 at which the driver started pressing the brake, in addition to switching from autonomous driving mode to manual driving mode, the driver is notified by the indicator and speaker 109.

Until the driver does the autonomous/manual switching switch and sets to autonomous driving mode again, travel is made to be performed in manual driving mode.

Furthermore, using the learning correction unit 103a, the deceleration level during autonomous driving mode when in similar deceleration after passing ends thereafter is corrected to the deceleration level An after the brake is pressed, and the deceleration level An as the control parameter and the driver information are stored.

During similar deceleration after passing, as shown by the solid line, after learning, we can see that this is a deceleration level after passing during autonomous driving mode that matches the senses of the same driver.

Next, the operational effects are explained.

With the vehicle control device and the vehicle control method of embodiment 6, the operational effects listed by example below are exhibited.

(1) When decelerating after passing during autonomous driving mode, when a brake operation by the driver is detected, the deceleration level after brake pressing as the correction value of the control parameters is stored together with the driver information, and for the same driver, the learned correction values are made to be used in deceleration after passing thereafter.

Thus, it is possible to match traveling during deceleration after passing during autonomous driving mode to the senses of the driver.

(2) By a brake operation when in autonomous driving mode, there is a switch to manual driving mode, and until the driver does autonomous/manual switch switching to the autonomous driving mode again, travel is made to be performed in manual driving mode.

Thus, it is possible to ensure safety during traveling after passing.

(3) Even if there was a brake operation when in autonomous driving mode, according to information from the travel environment recognition device 101, when the vehicle is traveling downhill or the signal in front of the vehicle is a red light, learning corrections are made to be prohibited.

Thus, when not an operation according to the senses of the driver, it is possible to prohibit wasteful learning corrections, so it is possible to set an autonomous driving mode that is better matched to the senses of the driver.

Other Embodiments

Above, modes for carrying out the present invention were explained based on embodiments, but the specific configuration of the present invention is not limited to the configurations shown in the embodiments, and even design modifications, etc., in a scope that does not stray from the gist of the invention are included in the present invention.

The invention claimed is:

1. A vehicle control device comprising:
   a travel environment recognition device configured to recognize travel environment ahead according to information relating to the travel environment input from outside;
   a vehicle travel state detection device configured to detect a vehicle travel state; and
   an autonomous/manual driving mode controller including:
      a control parameter calculation unit configured to calculate a control parameter according to the travel environment detected by the travel environment recognition device,
      an autonomous driving mode control unit configured to control at least one of an engine, a transmission, a brake, and a steering angle based on the control parameter calculated by the control parameter calculation unit,
      a manual driving mode control unit configured to control at least one of the engine, the transmission, the brake, and the steering angle according to operation by a driver; and
      a learning correction unit configured to store at least one of a plurality of control parameters indicating the vehicle travel state by operation of the driver in the autonomous driving mode, and to correct the control parameter calculated by the control parameter calculation unit in the autonomous driving mode according to the stored control parameter, wherein
   when the travel environment recognition device recognizes uphill or downhill, correction by the learning correction unit is prohibited.

2. The vehicle control device according to claim 1, wherein
   when the stored control parameter is the control parameter changed by a deceleration operation by the driver when entering a corner, the learning correction unit is configured to correct the control parameter in the autonomous driving mode so that a traveling vehicle speed is reduced in a corner, or so that a deceleration timing before entering the corner is made earlier.

3. The vehicle control device according to claim 1, wherein
   when the stored control parameter is the control parameter changed by an acceleration operation by the driver when traveling in a corner, the learning correction unit is configured to correct the control parameter in the autonomous driving mode so that a traveling vehicle speed when in a corner is made greater, or a deceleration timing before entering the corner is made later.

4. The vehicle control device according to claim 1, wherein
   when the stored control parameter is the control parameter changed by an acceleration operation by the driver when exiting a corner, the learning correction unit is configured to correct the control parameter in the autonomous driving mode so that an acceleration start is performed at a point when there is an acceleration operation.

5. The vehicle control device according to claim 1, wherein
   when the stored control parameter is the control parameter changed by an acceleration operation by the driver when exiting a corner, the learning correction unit is configured to correct the control parameter in the autonomous driving mode so that an acceleration level when exiting a corner is increased.

6. The vehicle control device according to claim 1, wherein
when the stored control parameter is the control parameter changed by an acceleration operation by the driver midway in passing acceleration, the learning correction unit is configured to correct the control parameter in the autonomous driving mode so that the acceleration level of the passing acceleration is increased.

7. The vehicle control device according to claim 1, wherein
when the stored control parameter is the control parameter changed by a deceleration operation by the driver midway in deceleration after passing, the learning correction unit is configured to correct the control parameter in the autonomous driving mode so that the deceleration level after passing is increased.

8. The vehicle control device according to claim 1, wherein
when the travel environment recognition device recognizes a red light, correction by the learning correction unit is prohibited.

9. A vehicle control method comprising:
performing one of:
an autonomous driving mode that calculates a control parameter according to travel environment recognized according to information relating to the travel environment input from outside, and controls at least one of an engine, a transmission, a brake, and a steering angle, based on the control parameter calculated, and
a manual driving mode that controls at least one of the engine, the transmission, the brake, and the steering angle according to an operation by a driver;
storing at least one of a plurality of control parameters indicating a vehicle travel state according to an operation by the driver in the autonomous driving mode; and
correcting the control parameter in the autonomous driving mode according to the stored control parameter, wherein
when uphill or downhill is recognized as the travel environment, the correcting of the control parameter in the autonomous driving mode is prohibited.

\* \* \* \* \*